Patented June 20, 1939

2,163,264

UNITED STATES PATENT OFFICE 2,163,264

CONDENSATION PRODUCTS FROM FORMALDEHYDE AND UREA

Otto Süssenguth, Erkner, near Berlin, Germany, assignor to Bakelite Gesellschaft mit beschränkter Haftung, Berlin, Germany No Drawing. Application April 19, 1937, Serial No. 137,768. In Germany April 28, 1936

11 Claims. (Cl. 260—45)

This invention relates to a process for the production of condensation products from formaldehyde and urea which may be worked up alone or in admixture with other substances into shaped articles or pressed masses.

According to this invention it has been found that resinous condensation products with valuable properties may be obtained by uniformly mixing urea without the addition of water or other liquids with solid, polymeric formaldehyde without the application of heat at ordinary room temperature, for example at 15 to 25° C., and allowing the mixture to stand likewise without the application of heat at low temperatures, preferably between 15 and 35° C. until the smell of formaldehyde has substantially disappeared. A fusible condensation product is obtained in this way which can be stored for a long time without substantial alteration, particularly without substantial hardening, and is admirably adapted for all purposes of application for which urea-formaldehyde artificial resins are usually used. The product may at moderately elevated temperature alone or in admixture with other substances be subjected to a heat treatment in order to increase its degree of condensation and be worked up alone or in admixture with suitable additions into lacquers, coatings, laminated sheets, shaped articles or pressed masses.

In carrying out the process of this invention it is essential that the production of the condensation product from urea and solid, polymeric formaldehyde should take place without any external supply of heat and at low temperatures, since only in this case is a product formed which is capable of being stored and is only relatively slightly susceptible to heat influences. If, for example, the mixture of urea and formaldehyde is subjected to even only moderate heating, for example to 50° C., before the formation of the condensation product, as evidenced by the disappearance of the formaldehyde smell, has taken place, the condensation will proceed at considerable speed until an infusible product is formed.

The ratio of urea to the solid polymeric formaldehyde may be varied within wide limits. About 70 to 90 parts by weight of formaldehyde are for example employed per 100 parts by weight of urea in order to obtain a hardenable resin. The condensation of urea with the solid, polymeric formaldehyde may also be carried out with the addition of catalysts and the urea may be partly replaced by other compounds, for example thiourea, which likewise combine with the formaldehyde to form resinous products. If an acid catalyst is employed this may be neutralised with advantage at the end of the storing period by adding basic substances, for example ZnO.

The condensation products obtained according to this invention may also be worked up in admixture with other artificial or natural resins.

In order to produce pressed masses the readily fusible condensation products obtained according to this invention are employed as binders and are mixed in known manner with fillers, and, if necessary, subjected to a short polymerisation process, for example in a heated drum. After the polymerisation process the mixture of the condensation product with the fillers and the like is with advantage finely comminuted and is then ready for pressing. The chemical and mechanical properties of the resulting pressed masses fulfil all the requirements demanded of urea pressed masses.

Natural or artificial resins, water-fixing agents, pigments, softeners and fillers of any kind may be added in known manner to the mixtures to be pressed.

The following examples serve to illustrate how the process of this invention may be carried into effect:

(1) 100 parts by weight of urea are intimately mixed with 90 parts by weight of para-formaldehyde and 5 parts by weight of ZnO by grinding in a ball mill. The resulting homogeneous mixture is stored for about 8 days at a temperature of about 30° C. until the formaldehyde smell has nearly disappeared. A dry, fusible and hardenable condensation product is obtained which is excellently adapted for storage and may be further worked up in known manner.

(2) 80 parts by weight of urea, 25 parts by weight of thiourea, 80 parts by weight of paraformaldehyde and 0.5 part by weight of crystalline citric acid are treated in a ball mill as described in Example 1 and stored for 3 days at about 25° C.

(3) The operation is carried out as in Example 1 but 10 parts by weight of a glycerinephthalic acid resin are added to the mixture of reaction components there described.

(4) 1 kgm. of urea and 0.7 kgm. of paraformaldehyde are finely mixed together in a ball mill, heating being as far as possible avoided, and then stored for 4 days at 25° C. The light agglomerated mass is mixed with 1 kgm. of wood meal and then heated for 2 hours to 75° C. The mixture is then ready for compression.

(5) 1 kgm. of urea, 0.75 kgm. of para-formaldehyde and 10 gms. of calcium hydroxide after being intimately mixed together are stored for 3 days at 30° C. and thereafter mixed with 0.8 kgm. of cellulose. Heating is then effected in a similar manner as described in Example 4 until a compressible mixture is formed.

(6) 1 kgm. of urea, 0.8 kgm. of alpha-trioxymethylene, 0.2 kgm. of light coloured phenol resin (resol) and 5 gms. of tartaric acid are finely mixed together in a ball mill and stored for 3 days at 20° C. The mixture is then mixed with 3 kgms. of wood meal, 0.5 kgm. of lithopone and 20 gms. of zinc oxide and is then ready for compression.

What I claim is:

1. A process for the manufacture of resinous, fusible condensation products which comprises uniformly mixing in the absence of liquids solid urea and solid polymeric formaldehyde at room temperature of about 15° to 25° C., and causing to react said urea and said solid polymeric formaldehyde by storing the mixture obtained at a low temperature of about 15° to 35° C. until the smell of formaldehyde has substantially disappeared.

2. A process for the manufacture of resinous, fusible condensation products which comprises intimately mixing in the absence of liquids 100 parts by weight of solid urea and about 70–90 parts by weight of solid polymeric formaldehyde at room temperature of about 15° to 25° C., and causing to react said urea and said solid polymeric formaldehyde by storing the mixture obtained at a low temperature of about 15° to 35° C. until the smell of formaldehyde has substantially disappeared.

3. A process for the manufacture of resinous, fusible condensation products which comprises uniformly mixing at room temperature of about 15° to 25° C. in the absence of liquids solid urea, solid thiourea and solid polymeric formaldehyde, and causing to react said urea, said thiourea and said solid polymeric formaldehyde by storing the mixture obtained at a low temperature of about 15° to 35° C. until the smell of formaldehyde has substantially disappeared.

4. A process for the manufacture of resinous, fusible condensation products which comprises uniformly mixing at room temperature of about 15° to 25° C. in the absence of liquids solid urea and solid polymeric formaldehyde in the presence of catalysts and causing to react said urea and said solid polymeric formaldehyde by storing the mixture obtained at a low temperature of about 15° to 35° C. until the smell of formaldehyde has substantially disappeared.

5. A process for the manufacture of resinous, fusible condensation products which comprises intimately mixing in the absence of liquids at room temperature of about 15° C. to 25° C. 100 parts by weight of solid urea and about 70 to 90 parts by weight of solid polymeric formaldehyde in the presence of catalysts and causing to react said urea and said solid polymeric formaldehyde by storing the mixture obtained at a low temperature of about 15° C. to 35° C. until the smell of formaldehyde has substantially disappeared.

6. A process for the manufacture of resinous, fusible condensation products as claimed in claim 5 wherein part of the urea is replaced by thiourea.

7. A process for the manufacture of resinous, fusible condensation products which comprises intimately mixing in the absence of liquids solid urea and solid polymeric formaldehyde in the presence of phenolaldehyde resins at room temperature of about 15° to 25° C., and causing to react said urea and said polymeric formaldehyde by storing the mixture obtained at a low temperature of about 15° to 35° C. until the smell of formaldehyde has substantially disappeared.

8. A process for the manufacture of resinous, fusible condensation products which comprises intimately mixing in the absence of liquids 100 parts by weight of solid urea and about 70 to 90 parts by weight of solid polymeric formaldehyde in the presence of catalysts and phenolaldehyde resins at room temperature of about 15° to 25° C., and causing to react said urea and said solid polymeric formaldehyde by storing the mixture obtained at a low temperature of about 15° to 35° C. until the smell of formaldehyde has substantially disappeared.

9. As a new product, the composition obtained by the process according to claim 2, said composition being a fusible, resinous condensation product which can be stored for a long time without substantial alteration and is slightly susceptible to heat influences.

10. As a new product, the composition obtained by the process according to claim 3, said composition being a fusible, resinous condensation product which can be stored for a long time without substantial alteration and is slightly susceptible to heat influences.

11. As a new product, the composition obtained by the process according to claim 5, said composition being a fusible, resinous condensation product which can be stored for a long time without substantial alteration and is slightly susceptible to heat influences.

OTTO SÜSSENGUTH.